US012626204B2

(12) United States Patent
Alamri et al.

(10) Patent No.: US 12,626,204 B2
(45) Date of Patent: May 12, 2026

(54) FORECASTING ENERGY DEMAND AND CO₂ EMISSIONS FOR A GAS PROCESSING PLANT INTEGRATED WITH POWER GENERATION FACILITIES

(71) Applicant: Saudi Arabian Oil Company, Dhahran (SA)

(72) Inventors: Mussa Hadi Alamri, Dammam (SA); Muhammad Abbas, Dhahran (SA); Ali H. Al-Qahtani, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 510 days.

(21) Appl. No.: 18/074,827

(22) Filed: Dec. 5, 2022

(65) Prior Publication Data

US 2024/0185149 A1     Jun. 6, 2024

(51) Int. Cl.
| | |
|---|---|
| *G06Q 10/063* | (2023.01) |
| *G06Q 10/0631* | (2023.01) |
| *G06Q 50/06* | (2024.01) |

(52) U.S. Cl.
CPC ....... *G06Q 10/06315* (2013.01); *G06Q 50/06* (2013.01)

(58) Field of Classification Search
None
See application file for complete search history.

(56) References Cited

U.S. PATENT DOCUMENTS

| | | | |
|---|---|---|---|
| 7,877,235 B2 | 1/2011 | McConnell et al. | |
| 10,346,933 B2 | 7/2019 | Maasoumy et al. | |

(Continued)

FOREIGN PATENT DOCUMENTS

| | | |
|---|---|---|
| CN | 114266471 A | 4/2022 |
| CN | 114282736 | 4/2022 |

(Continued)

OTHER PUBLICATIONS

C.-C. Cormos et al., "Application of Carbonate Looping Cycle as an Energy-efficient Decarbonization Process of Key Fossil-intensive Industrial Applications," 2021 10th International Conference on Energy and Environment (Ciem), Bucharest, Romania (Year: 2021).*
epa.gov [online], "Scope 3 Inventory Guidance," EPA Center for Corporate Climate Leadership, available on or before Nov. 27, 2006, via Internet Archive: Wayback Machine URL <http://web.archive.org/web/20161127162705/https://www.epa.gov/climateleadership/scope-3-inventory-guidance>, retrieved on Apr. 18, 2023, retrieved from URL <https://www.epa.gov/climateleadership/scope-3-inventory-guidance>, 13 pages.

(Continued)

*Primary Examiner* — Jerry O'Connor
*Assistant Examiner* — Philip N Warner

(57) ABSTRACT

Systems and methods include a computer-implemented method for determining energy efficiency and emissions. Real-time energy stream data for a gas processing plant is received. Correlations of energy streams between demand-side energy demands for meeting production requirements of the gas processing plant and fuel requirements for supply-side equipment of the gas processing plant are generated. Machine learning algorithms are trained using the correlations of the energy streams to identify relationships among dependent variables and independent variables of demand-side energy consumers and supply-side energy sources. Forecasted values of total energy consumption of the gas processing plant are determined using the machine learning algorithms and real-time energy stream data. Forecasting models are re-trained using new data if an error between the forecasted values and actual energy demand exceeds a threshold. An energy intensity (EI) for the gas processing plant is generated. CO₂ emissions for the gas processing plant are determined.

16 Claims, 7 Drawing Sheets

(56)             References Cited

U.S. PATENT DOCUMENTS

| | | | |
|---|---|---|---|
| 2007/0032911 A1 | 2/2007 | Clesle et al. | |
| 2013/0190940 A1* | 7/2013 | Sloop ................. | G05D 23/1917 |
| | | | 700/291 |
| 2013/0238154 A1* | 9/2013 | Noureldin ................. | G06F 1/26 |
| | | | 700/288 |
| 2016/0247065 A1* | 8/2016 | Nasle ........................ | G06N 5/02 |
| 2017/0091615 A1 | 3/2017 | Liu et al. | |
| 2018/0089704 A1* | 3/2018 | Ortiz ...................... | G06Q 50/06 |
| 2018/0285788 A1* | 10/2018 | Andrei ................. | G06F 16/287 |
| 2019/0302706 A1* | 10/2019 | Curtis ................. | G05B 13/026 |
| 2019/0347590 A1* | 11/2019 | Rajasekaran ...... | G06Q 10/0635 |
| 2021/0150412 A1* | 5/2021 | Rashidi .................. | G06N 20/10 |
| 2021/0182980 A1 | 6/2021 | Rahman et al. | |
| 2022/0109175 A1 | 4/2022 | Allinson et al. | |
| 2022/0253725 A1* | 8/2022 | Feng ...................... | G06N 20/00 |
| 2022/0285938 A1* | 9/2022 | Mehta .................... | G06Q 50/06 |
| 2024/0159327 A1* | 5/2024 | Prost .................. | F16K 37/0083 |

FOREIGN PATENT DOCUMENTS

| | | | | |
|---|---|---|---|---|
| EP | 3333802 A1 * | 6/2018 | ............. | C02F 3/006 |
| EP | 3992871 A1 | 5/2022 | | |
| JP | 2010146567 A * | 7/2010 | ......... | G05B 23/0294 |
| WO | WO-2008030854 A2 * | 3/2008 | ............... | C12P 7/10 |

OTHER PUBLICATIONS

"Technical Guidance for Calculating Scope 3 Emissions," Greenhouse Gas Protocol, World Resources Institute & World Business Council for Sustainable Development, 2013, 182 pages.

SAIP Examination Report in SAIP Appln. No. 123450957, mailed on Mar. 31, 2025, 17 pages.

* cited by examiner

Figure 6:
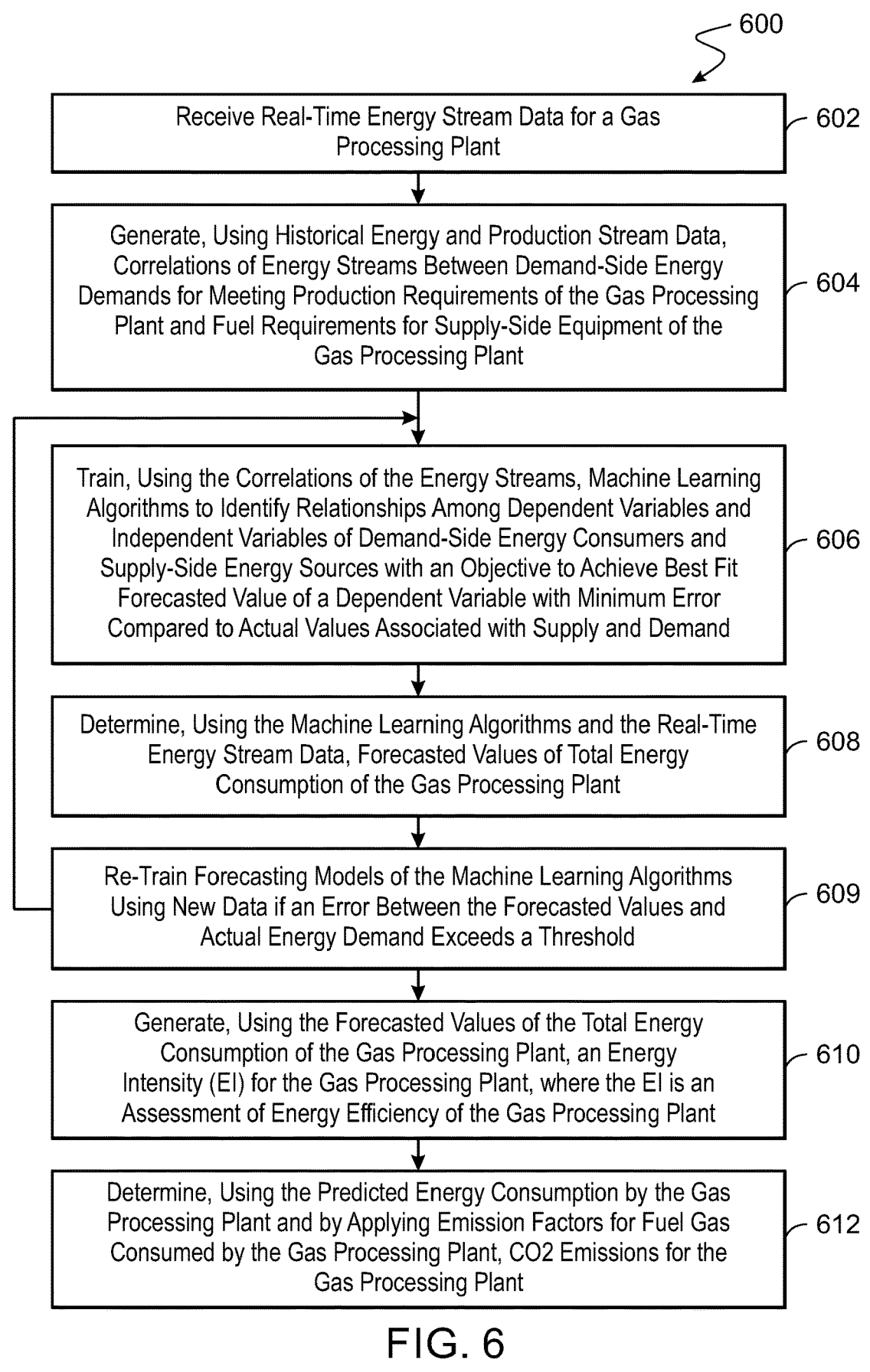

600

| |
|---|
| Receive Real-Time Energy Stream Data for a Gas Processing Plant |

602

| |
|---|
| Generate, Using Historical Energy and Production Stream Data, Correlations of Energy Streams Between Demand-Side Energy Demands for Meeting Production Requirements of the Gas Processing Plant and Fuel Requirements for Supply-Side Equipment of the Gas Processing Plant |

604

| |
|---|
| Train, Using the Correlations of the Energy Streams, Machine Learning Algorithms to Identify Relationships Among Dependent Variables and Independent Variables of Demand-Side Energy Consumers and Supply-Side Energy Sources with an Objective to Achieve Best Fit Forecasted Value of a Dependent Variable with Minimum Error Compared to Actual Values Associated with Supply and Demand |

606

| |
|---|
| Determine, Using the Machine Learning Algorithms and the Real-Time Energy Stream Data, Forecasted Values of Total Energy Consumption of the Gas Processing Plant |

608

| |
|---|
| Re-Train Forecasting Models of the Machine Learning Algorithms Using New Data if an Error Between the Forecasted Values and Actual Energy Demand Exceeds a Threshold |

609

| |
|---|
| Generate, Using the Forecasted Values of the Total Energy Consumption of the Gas Processing Plant, an Energy Intensity (EI) for the Gas Processing Plant, where the EI is an Assessment of Energy Efficiency of the Gas Processing Plant |

610

| |
|---|
| Determine, Using the Predicted Energy Consumption by the Gas Processing Plant and by Applying Emission Factors for Fuel Gas Consumed by the Gas Processing Plant, $CO_2$ Emissions for the Gas Processing Plant |

FORECASTING ENERGY DEMAND AND CO₂ EMISSIONS FOR A GAS PROCESSING PLANT INTEGRATED WITH POWER GENERATION FACILITIES

TECHNICAL FIELD

The present disclosure applies to energy requirements and emissions of a facility.

BACKGROUND

A facility, such as a gas or oil facility, includes supply and demand sides of energy streams. Energy consumption demand and carbon dioxide ($CO_2$) emissions are affected by raw gas feeds in a gas plant, including process units configuration, final products' specifications, and ambient conditions.

SUMMARY

The present disclosure describes techniques that can be used for forecasting energy requirements for, and emissions from, a facility. In some implementations, a computer-implemented method includes the following. Real-time energy stream data for a gas processing plant is received. Correlations of energy streams between demand-side energy demands for meeting production requirements of the gas processing plant and fuel requirements for supply-side equipment of the gas processing plant are generated using historical energy and production stream data. Machine learning algorithms are trained using the correlations of the energy streams to identify relationships among dependent variables and independent variables of demand-side energy consumers and supply-side energy sources with an objective to achieve best fit forecasted value of a dependent variable with minimum error compared to actual values associated with supply and demand. Forecasted values of total energy consumption of the gas processing plant are determined using the machine learning algorithms and the real-time energy stream data. Forecasting models of the machine learning algorithms are re-trained using new data if an error between the forecasted values and actual energy demand exceeds a threshold. An energy intensity (EI) for the gas processing plant is generated using the forecasted values of the total energy consumption of the gas processing plant. The EI is an assessment of energy efficiency of the gas processing plant. $CO_2$ emissions for the gas processing plant are determined using the predicted energy consumption by the gas processing plant and by applying emission factors for fuel gas consumed by the gas processing plant.

Techniques of the present disclosure are implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The use of particular implementations of the subject matter described in this specification can realize or result in one or more of the following advantages. Techniques of the present disclosure can overcome the technical problem of forecasting energy consumption demand for a gas processing facility, especially a facility that has a cogeneration (cogen) facility (e.g., producing electric power and steam) as part of the operational boundary. With minor adjustments, the techniques can be applied to all types of gas processing plants. The techniques can lead to proactive monitoring and optimization of energy efficiency performance of a gas plant, and establishing challenging energy performance targets based on future production plans.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIG. 6 is a flowchart of an example of a method for generating a dashboard for a gas processing plant that displays energy efficiency KPI information, according to some implementations of the present disclosure.

FIG. 7 is a block diagram illustrating an example computer system used to provide computational functionalities associated with described algorithms, methods, functions, processes, flows, and procedures as described in the present disclosure, according to some implementations of the present disclosure.

Like reference numbers and designations in the various drawings indicate like elements.

DETAILED DESCRIPTION

The following detailed description describes techniques for forecasting energy requirements for, and emissions from, a facility. Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The present disclosure describes techniques that can be used to forecast energy consumption demand and $CO_2$ emissions for processing the raw gas feed in a gas plant. Since the composition of feed gas continuously varies due to changes in supply sources and outputs from wells, predicting the energy required to process the feed gas becomes very challenging. As part of the discovery process, a detailed workflow was developed to forecast energy for each supply- and demand-side energy stream. Data analysis and modeling tools were then applied to formulate machine learning models. These models can be used to predict values for intermediary and final energy streams. During the discovery process, the overall energy consumption was then used to determine the energy intensity of the plant. The relevant conversion factors for each type of energy were applied to predict energy related $CO_2$ emissions for the plant.

The present disclosure covers techniques for forecasting energy demand for a gas processing plant that is integrated with a cogeneration (cogen) facility (e.g., producing electric power and steam). The following sections include steps involved in the techniques for forecasting.

Identification of Energy, Products, and Feed Streams

Energy, products, and feed streams, along with other parameters impacting the energy consumption, are identified. Typical streams for a gas processing plant include: a) Feed streams: Wet gas from gas fields and gas oil separation plants (GOSPs); b) product streams: sales gas (SG), hydrocarbon condensate (HC Cond), sulfur (Sul) from sulfur recovery units (SRUs); c) Energy Streams, including power (P), steam (S), fuel gas for boilers (FGB), fuel gas for cogeneration plant (FGCs), fuel gas for other processes (FGP); and ambient temperature (T).

Figure 1:
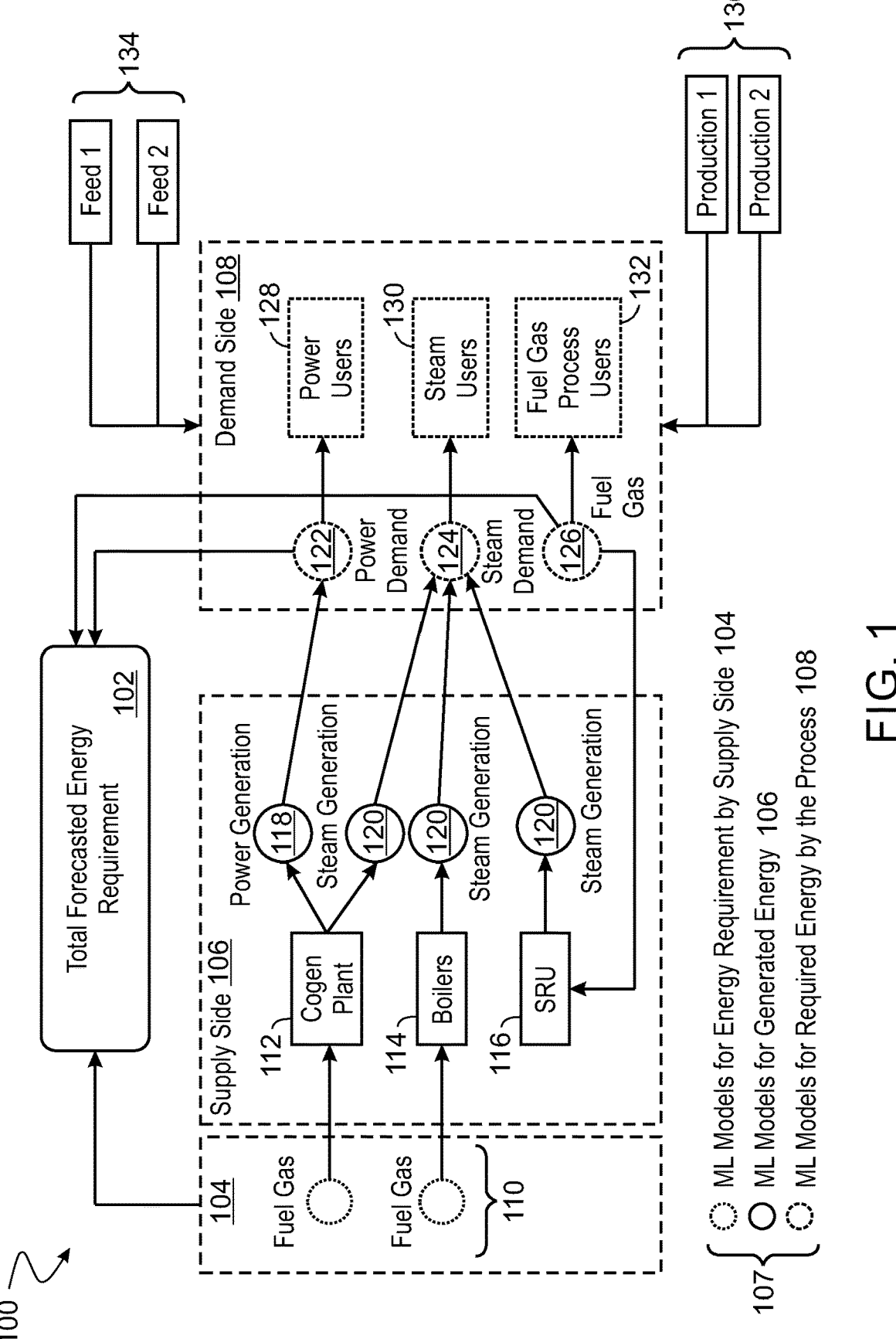
FIG. 1 is a diagram showing an example of system of supply and demand sides energy streams, according to some implementations of the present disclosure.

FIG. 1 is a diagram showing an example of system 100 of supply and demand sides energy streams, according to some implementations of the present disclosure. As such, FIG. 1 shows a high-level structure for the overall layout of an energy forecasting workflow, for example. The system 100 includes a function for generating a total forecasted energy requirement 102. The total forecasted energy requirement 102 is based on fuel sources 104, supply side 106 equipment and functions, demand side 108 equipment and functions, and elements within the system 100 defined by a key 107 indicating different line styles. The fuel sources 104 include fuel gas sources 110. The supply side 106 equipment and functions include a cogen plant 112, boilers 114, and SRU 116. Power generation 118 is produced by the cogen plant 112. Steam generation 120 is produced by the cogen plant 112, the boilers 114, and the SRU 116. The power generation 118 produces power to meet power demand 122 of power used by power users 128. The steam generation 120 produces steam to meet steam demand 124 of steam used by steam users 130. Fuel gas 126 is used by the SRU 116 and by fuel gas process users 132. The demand-side 108 is supplied by feeds 134 and production sources 136.

Development of Correlations for Energy Streams

Correlations can be developed for all energy streams starting from demand-side energy that is required to meet the production requirements, fuel requirements for supply-side equipment (including cogeneration plants and boilers), and other supply side energy streams.

Demand-side energy forecasting can use the following equations:

$$\text{Power Demand, P}=f(\text{SG,HC Cond,Sul,T}) \tag{1}$$

$$\text{Total Steam Demand, S}=f(\text{SG,HC Cond,Sul,T}) \tag{2}$$

$$\text{Fuel Gas for other processes, FGP}=f(\text{SG,HC Cond, Sul,T}) \tag{3}$$

Supply-side energy forecasting can use the following equations:

$$\text{Steam generated by Cogens, SC}=f(\text{CP,T}) \tag{4}$$

where Cogeneration Power Generation (CP) is a manual input based on operating plans of a cogeneration plant.

$$\text{Steam generated by SRU, SR}=f(\text{SG,HC Cond,Sul,T}) \tag{5}$$

$$\text{Steam generated by Boilers, SB}=\text{S+ES}-\text{SC}-\text{SR} \tag{6}$$

where Excess Steam (ES) is a manual input based on operating needs of the gas plants.

$$\text{Fuel Gas for Cogeneration Plant, FGC}=f(\text{CP,T}) \tag{7}$$

$$\text{Fuel Gas for Boilers, FGB}=f(\text{SB,T}) \tag{8}$$

Development of Machine Learning (ML) Algorithms

Machine learning (ML) algorithms can be developed to build the models. Various sets of independent variables can be tested to improve the relationships among dependent and independent variables with an objective to achieve the best fit, or in other words, to get the forecasted value of a dependent variable with minimum error compared to the actual value. Typical errors are less than 3%, and in some cases, less than 1%. FIG. 1 shows ML nodes for demand and supply-side energy streams. Each ML node goes through a complete data analysis cycle. This includes gathering historical data of the identified variables during a method discovery process. Then, data cleansing, data training and testing, data scoring and validation, and best-fit model selection are performed.

Figure 2:
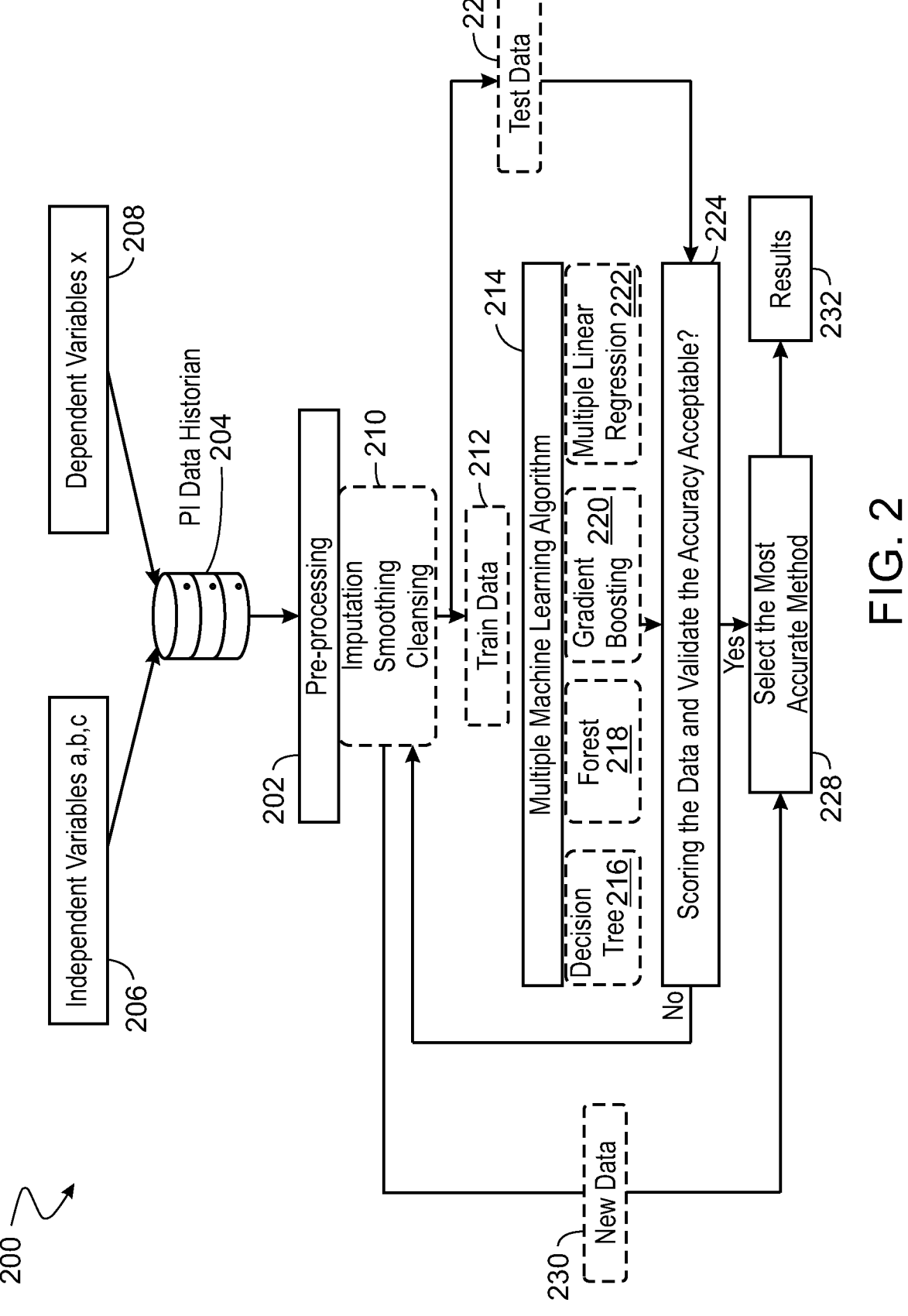
FIG. 2 illustrates an example of a data analysis cycle applicable to each node represented in FIG. 1, according to some implementations of the present disclosure.

FIG. 2 illustrates an example of a data analysis cycle 200 applicable to each node represented in FIG. 1, according to some implementations of the present disclosure. Software applications (e.g., available in the industry) can be used to conduct data analysis and model development. The data analysis cycle 200 includes using and scoring multiple different ML algorithms in order to determine and select a specific algorithm that best (among the multiple different ML algorithms) produces an acceptable accuracy result.

In the data analysis cycle 200, pre-processing 202 uses data from a PI data historian 204 that is generated using independent variable 206 (e.g., including variables a, b, c) and dependent variables 208 (e.g., including the variable x). The pre-processing 202 performs imputation smoothing and cleansing 210. Data is split into training data 212 and test data 226 (e.g., using split ratios of 60% and 40%). Multiple machine learning algorithms 214 can use the training data 212 to generate a decision tree 216, a forest 218, gradient boosting 220, and multiple linear regression 222. The data outputs of the multiple machine learning algorithms 214 are scored 224 and validated for acceptable accuracy (e.g., accuracy above a predetermined threshold, such as 1% or 3%). A most accurate method 228 is evaluated, based on new data 230, and selected from the scoring to generate results 232.

Application of the Resulting Mathematical Models

Resulting mathematical models developed in the previous section can be used to forecast values of dependent variables. The variables can then be used to forecast the total energy consumption, e.g., using the following equations:

$$\text{Total Fuel Gas Consumption, TFG}=\text{FGB+FGB+FGP} \tag{9}$$

$$\text{Net Energy Consumption, Energy}_{net}=\text{TFG}-\text{FGPE+} \text{FGPI} \tag{10}$$

where FGPE is the Fuel Gas equivalent for Power Export, and where FGPI=Fuel Gas equivalent for Power Import.

Fuel Gas for Power Export (FGPE) can be given by:

$$FGPE\left(\frac{MMBtu}{h}\right) = \frac{\text{Exported Power (MW)} \times 3.412}{\text{Cogen Power Efficiency}} \quad (11)$$

$$\text{where Cogen Power Efficiency} = \frac{CP \text{ (MW)} \times 3.412}{FGC\left(\frac{MMBtu}{h}\right)} \quad (12)$$

Fuel Gas for Power Import, $$FGPI\left(\frac{MMBtu}{h}\right) = \frac{\text{Imported Power (MW)} \times 3.412}{\text{Grid Efficiency}} \quad (13)$$

Figure 3:
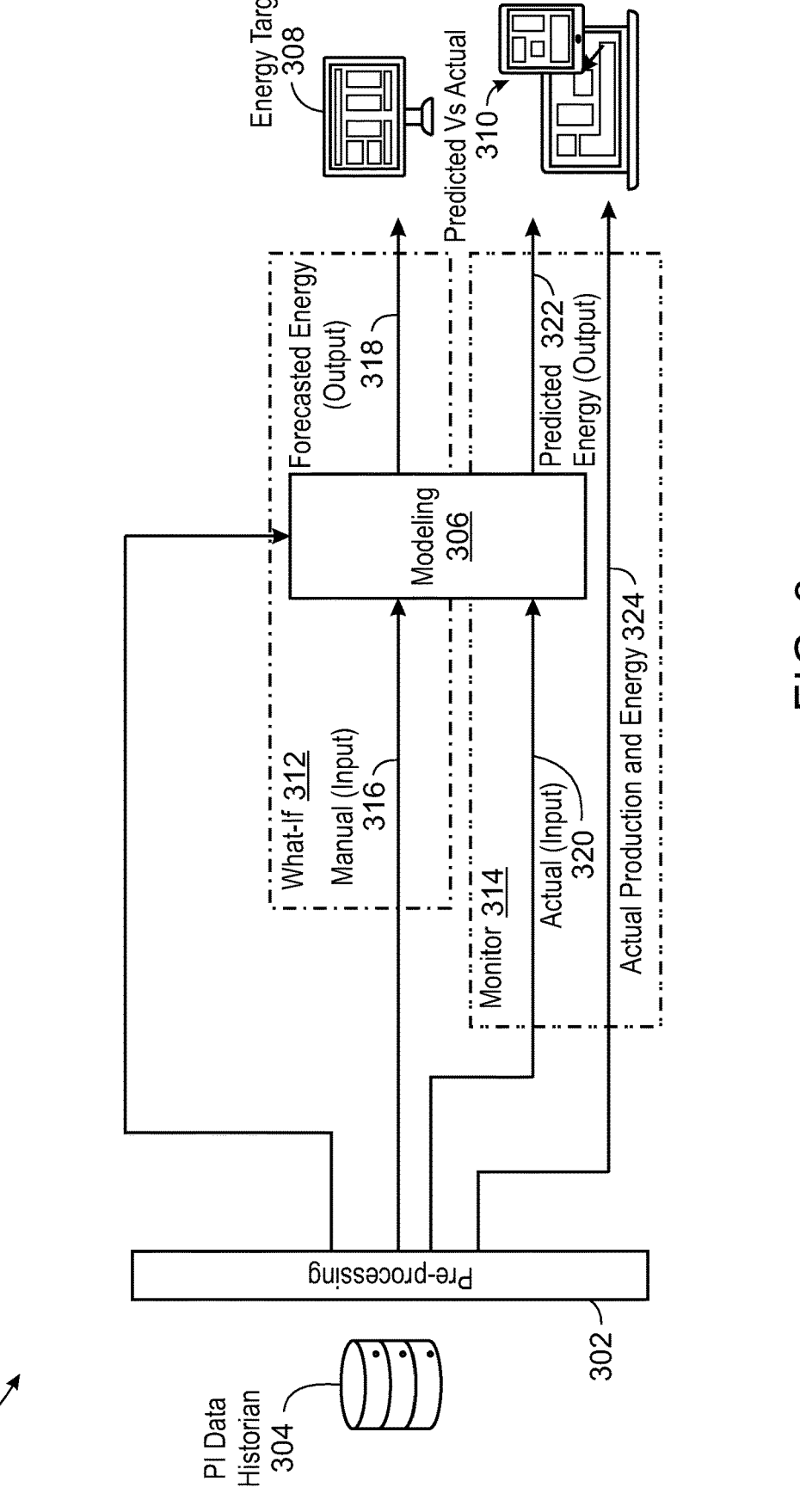
FIG. 3 is a diagram showing an example architecture of typical data models, according to some implementations of the present disclosure.

FIG. 3 is a diagram showing an example architecture 300 of typical data models, according to some implementations of the present disclosure. Developed models can be used in two ways: 1) for real-time prediction of energy and energy intensity for optimizing energy performance, and 2) for future energy prediction to set energy intensity targets. The term real-time can correspond, for example, to predictions that occur within a specified period of time, such as within five minutes after receiving current production information from a well. Optimizing energy performance can refer to achieving improvements to energy performance greater than a predefined threshold percentage.

In the architecture 300 of typical data models, a pre-processing function 302 can perform pre-processing on data from a PI data historian 304 to create clean data for use by the modeling 306. The modeling 306 can be used to generate information displayable to users regarding energy targets 308 and predicted versus actual energy use 310. In a monitoring function 314, the modeling 306 can use actual inputs 320 to generate predicted energy 322 as an output. Display of information for actual production and energy 310 can be based on actual production and energy 324 available from pre-processing 302. A what-if function 312 can process manual input 316 fed into the modeling to generate forecasted energy 318 as an output.

Calculating Energy Intensity

After forecasting the energy demand, Energy Intensity (EI) can be calculated. EI can be a Key Performance Indicator (KPI) used for energy performance measurement. EI can be determined using:

$$\text{Energy Intensity } (EI) = \frac{\text{Energy}_{net}}{\text{Total Production}} \quad (14)$$

Carbon dioxide ($CO_2$) emissions from predicted energy consumption can be determined by applying relevant emission factors for fuel gas consumed by the plant, and power imported from the grid. Typically, gas plants integrated with cogeneration units are self-sufficient in power generation and have very limited power import during the downtime of cogeneration. Carbon intensity factors for the grid can be used to determine Scope-2 $CO_2$ emissions associated with any imported power.

Figure 4:
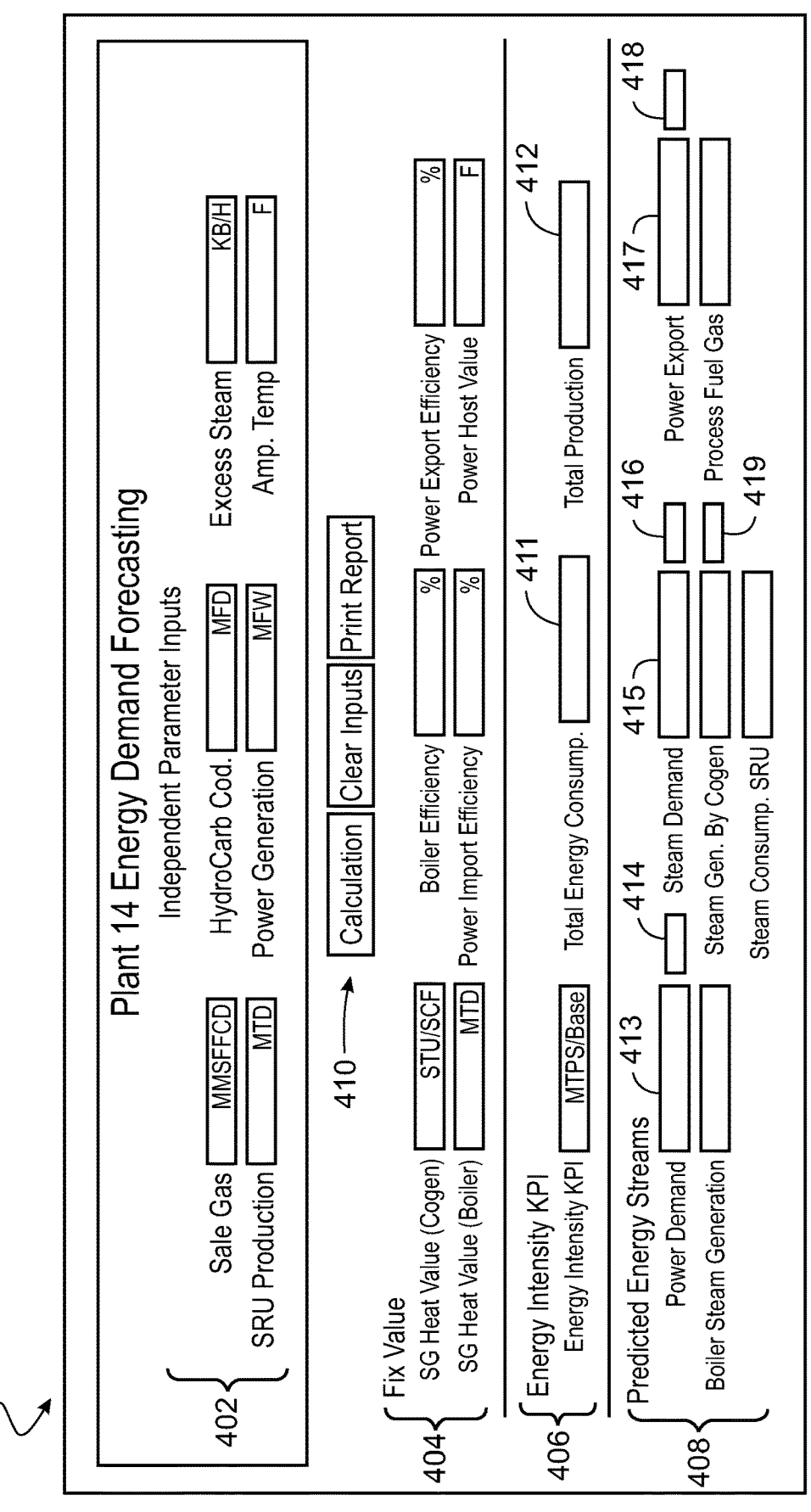
FIG. 4 is a screenshot showing an example of an energy demand forecasting screen, according to some implementations of the present disclosure.

FIG. 4 is a screenshot showing an example of an energy demand forecasting screen 400, according to some implementations of the present disclosure. An independent parameter input area 402 in the 400 can be used to define one or more independent variables to be modeled. A fix value area 404 be used to define values for constants used in the in forecasting correlations. An energy intensity KPI area 406 can be used to display net energy consumption as predicted by the models, total planned production, and resulting Energy Intensity KPI targets. A predicted energy streams area 408 can be used to display the predicted values of individual energy streams such as power, steam, and fuel gas. Options 410 (e.g., Clear, Calculation, and Print) can be used to clear input values for independent variables for a prediction scenario on the screen, re-run calculations using the prediction models after entering new values of independent variables, and print the results for a particular prediction scenario.

Field 411 displays the predicted net energy consumption, based on the predicted values of energy stream shown in area 408. Field 412 displays the calculated value of total production, based on the products entered in area 402. Field 413 displays predicted power demand. Field 414 is a spare button for showing more details/breakdown for predicted power demand. Field 415 displays predicted steam demand. Field 416 is a spare button to show more details/breakdown for predicted steam demand. Field 417 displays the calculated value for power export. Field 418 is a spare button to show more details/breakdown for power demand. Field 419 displays the predicted steam generated by cogeneration plant.

Figure 5:
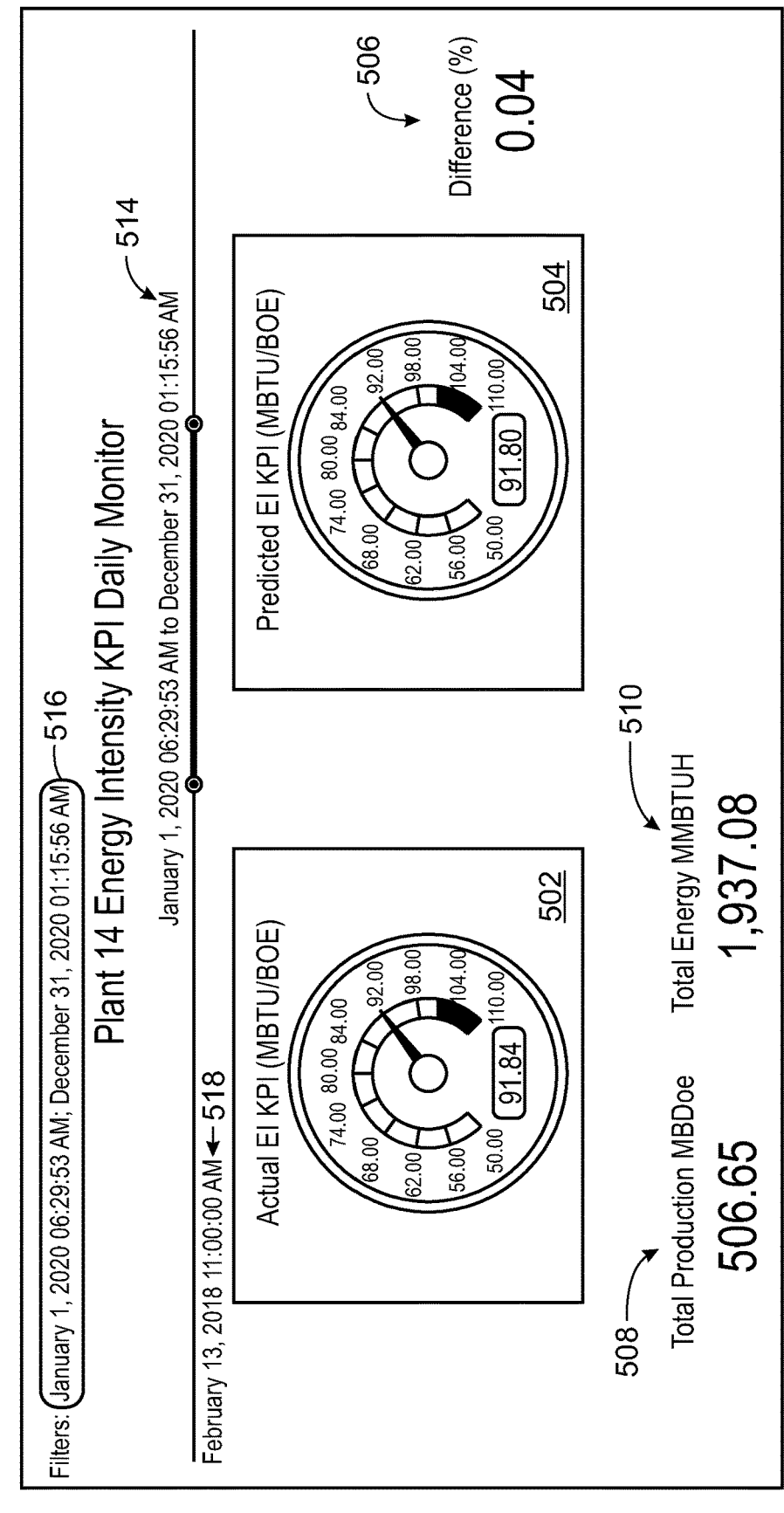
FIG. 5 is a screenshot showing an example of an energy intensity KPI daily monitor dashboard, according to some implementations of the present disclosure.

FIG. 5 is a screen shot showing an example of an energy intensity KPI daily monitor dashboard 500 for displaying energy-related values for a gas processing plant, according to some implementations of the present disclosure. The dashboard 500 includes an actual EI KPI display 502 (e.g., measured in thousands of British thermal units per barrels of oil equivalent (MBTU/BOE)), a predicted EI KPI display 504 (e.g., measured in MBTU/BOE), a computed difference 506 between the two readings, a total production 508 (e.g., measured in thousand barrels per day oil equivalent (MB-DOE)), and a total energy 510 e.g., measured in millions of international British thermal units per hour (MIMBTU/H)). The information provided in the dashboard 500 includes a date range 514 identifying a time period to which the information applies, a filter 516 specifying a time period for which the information is requested by the user, and a presentation date 518 identifying a date and time that the information is displayed.

FIG. 6 is a flowchart of an example of a method 600 for generating a dashboard for a gas processing plant that displays energy efficiency KPI information, according to some implementations of the present disclosure. For clarity of presentation, the description that follows generally describes method 600 in the context of the other figures in this description. However, it will be understood that method 600 can be performed, for example, by any suitable system, environment, software, and hardware, or a combination of systems, environments, software, and hardware, as appropriate. In some implementations, various steps of method 600 can be run in parallel, in combination, in loops, or in any order.

At 602, real-time energy stream data for a gas processing plant is received. For example, the real-time energy stream data can include: feed streams for wet gas from gas fields and gas oil separation plants (GOSPs); product streams for sales gas (SG), hydrocarbon condensate (HC Cond), sulfur (Sul) from sulfur recovery units (SRUs); energy streams from energy sources including power (P), steam (S), fuel gas for boilers (FGB), fuel gas for cogeneration plant (FGC), and fuel gas for other processes (FGP); and ambient temperatures (T). In some implementations, data cleaning is performed on the real-time energy stream data, e.g., to verify data and to remove any data that is not useful in subsequent steps of method 600. From 602, method 600 proceeds to 604.

At 604, correlations of energy streams between demand-side energy demands for meeting production requirements of the gas processing plant and fuel requirements for supply-side equipment of the gas processing plant are generated using historical energy and production streams data. The supply-side equipment can include cogeneration plants and boilers, for example. The initial correlations and dependencies of demand-side energy streams can be established using plant operations knowledge and engineering knowledge. Various permutations can be tested in the next step to achieve best-fit correlations resulting in minimum error. From 604, method 600 proceeds to 606.

At 606, ML algorithms are trained using the correlations of the energy streams to identify relationships among dependent variables and independent variables of demand-side energy consumers and supply-side energy sources with an objective to achieve the best-fit forecasted value of a dependent variable with minimum error compared to actual values associated with supply and demand. The historical data can be split into two datasets: a training dataset and test data. Modeling software can use the training data to determine the best-fit correlations. The correlations can be tested against a selected set of test data to assess the error between predicted values and the test data. If the error is within an acceptable range, then the prediction models are accepted. From 606, method 600 proceeds to 608.

At 608, forecasted values of total energy consumption of the gas processing plant are determined using the ML algorithms and the real-time energy stream data. For example, the forecasted values can be determined using Equations (1)-(13).

In some implementations, method 600 includes machine learning algorithm scoring. Multiple different ML algorithms are executed against training data. The multiple different ML algorithms can include, for example, at least a decision tree algorithm, a forest algorithm, and a gradient boosting algorithm. Each of the different ML algorithms is scoring based on accuracy of results. A specific algorithm that best produces an acceptable accuracy result is selected from the multiple different ML algorithms based on the scoring.

At 609, forecasting models of the machine learning algorithms are re-trained using new data if an error between the forecasted values and actual energy demand exceeds a threshold. For example, steps 606 and 608 are repeated until the forecasted values and values of the actual energy demand converge.

At 610, an energy intensity for the gas processing plant is generated using the forecasted values of the total energy consumption of the gas processing plant. The EI, e.g., determined using Equation (1), is an assessment of energy efficiency of the gas processing plant. From 610, method 600 proceeds to 612.

At 612, $CO_2$ emissions for the gas processing plant are determined using the predicted energy consumption by the gas processing plant and by applying emission factors for fuel gas consumed by the gas processing plant. Energy efficiency information, including the EI, can also be used to determine information for the gas processing plant. After 612, method 600 can stop.

In some implementations, method 600 further includes generating, using the $CO_2$ emissions for the gas processing plant, a dashboard that includes energy efficiency key performance indicator (KPI) information. For example, as shown in FIG. 5, the dashboard can include an actual EI KPI reading, a predicted EI KPI reading, a computed difference between the actual EI KPI reading, and the predicted EI KPI reading, a total production, and a total energy.

In some implementations, in addition to (or in combination with) any previously-described features, techniques of the present disclosure can include the following. Outputs of the techniques of the present disclosure can be performed before, during, or in combination with other operations, for example, at a gas processing plant. Information can be presented in one or more textual, tabular, or graphical formats, such as through a dashboard. The information can be presented at one or more on-site locations (such as at an oil processing or other facility), on the Internet (such as on a webpage), on a mobile application (or "app"), or at a central processing facility. The presented information can include suggestions, such as suggested changes in parameters or processing inputs, that the user can select to implement improvements in a production environment, such as in the exploration, production, and/or testing of petrochemical processes or facilities. For example, the suggestions can include parameters that, when selected by the user, can cause a change to, or an improvement in, process parameters (including condensate separation level, produced gas density, and composition, etc.) or overall production of a gas or crude production plant. The suggestions, when implemented by the user, can improve the speed and accuracy of calculations, streamline processes, improve models, and solve problems related to efficiency, performance, safety, reliability, costs, downtime, and the need for human interaction. In some implementations, the suggestions can be implemented in real-time, such as to provide an immediate or near-immediate change in operations or in a model. The term real-time can correspond, for example, to events that occur within a specified period of time, such as within one minute or within one second. Events can include readings or measurements captured by equipment/instruments such as sensors, pumps, online analyzers, or other equipment. The readings or measurements can be analyzed, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas processing facilities. For example, outputs of the present disclosure can be used as inputs to other equipment and/or systems at a facility. This can be especially useful for systems or various pieces of equipment that are located several meters or several miles apart, or are located in different countries or other jurisdictions.

Figure 7:
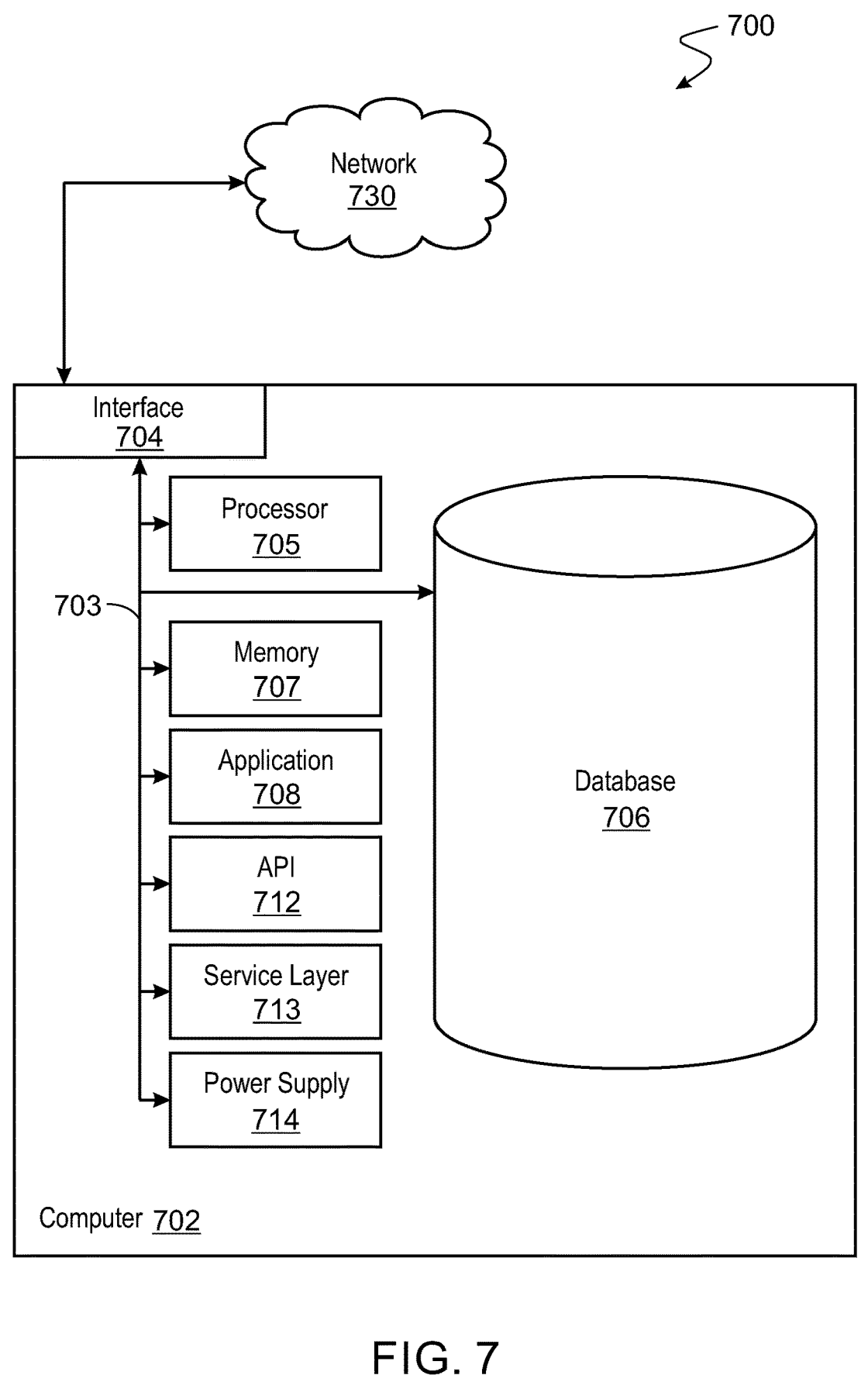

FIG. 7 is a block diagram of an example computer system 700 used to provide computational functionalities associated with described algorithms, methods, functions, processes, flows, and procedures described in the present disclosure, according to some implementations of the present disclosure. The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

At a top level, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both) over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 7, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 7, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 708 can be external to the computer 702.

The computer 702 can also include a power supply 714. The power supply 714 can include a rechargeable or nonrechargeable battery that can be configured to be either user- or non-user-replaceable. In some implementations, the power supply 714 can include power-conversion and management circuits, including recharging, standby, and power management functionalities. In some implementations, the power supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

Described implementations of the subject matter can include one or more features, alone or in combination.

For example, in a first implementation, a computer-implemented method includes the following. Real-time energy stream data for a gas processing plant is received. Correlations of energy streams between demand-side energy demands for meeting production requirements of the gas processing plant and fuel requirements for supply-side equipment of the gas processing plant are generated using historical energy and production stream data. Machine learning algorithms are trained using the correlations of the energy streams to identify relationships among dependent variables and independent variables of demand-side energy consumers and supply-side energy sources with an objective to achieve best fit forecasted value of a dependent variable with minimum error compared to actual values associated with supply and demand. Forecasted values of total energy consumption of the gas processing plant are determined using the machine learning algorithms and the real-time energy stream data. Forecasting models of the machine learning algorithms are re-trained using new data if an error between the forecasted values and actual energy demand exceeds a threshold. An energy intensity (EI) for the gas processing plant is generated using the forecasted values of the total energy consumption of the gas processing plant. The EI is an assessment of energy efficiency of the gas processing plant. $CO_2$ emissions for the gas processing plant are determined using the predicted energy consumption by the gas processing plant and by applying emission factors for fuel gas consumed by the gas processing plant.

The foregoing and other described implementations can each, optionally, include one or more of the following features:

A first feature, combinable with any of the following features, where the real-time energy stream data includes: feed streams for wet gas from gas fields and gas oil separation plants (GOSPs); product streams for sales gas (SG), hydrocarbon condensate (HC Cond), sulfur (Sul) from sulfur recovery units (SRUs); energy streams from energy sources including power (P), steam (S), fuel gas for boilers (FGB), fuel gas for cogeneration plant (FGC), and fuel gas for other processes (FGP); and ambient temperatures (T).

A second feature, combinable with any of the previous or following features, where supply-side equipment includes cogeneration plant and boilers.

A third feature, combinable with any of the previous or following features, the method further including generating, using the $CO_2$ emissions for the gas processing plant, a dashboard that includes energy efficiency key process indicator (KPI) information.

A fourth feature, combinable with any of the previous or following features, where the dashboard includes an actual EI KPI reading, a predicted EI KPI reading, a computed different between the actual EI KPI reading, and the predicted EI KPI reading, a total production, and a total energy.

A fifth feature, combinable with any of the previous or following features, the method further including performing data cleaning on the real-time energy stream data.

A sixth feature, combinable with any of the previous or following features, the method further including: executing, using the real-time energy stream data, multiple different ML algorithms; scoring the multiple different ML algorithms based on accuracy of results; and selecting, from the multiple different ML algorithms and based on the scoring; a specific algorithm that best produces an acceptable accuracy result.

A seventh feature, combinable with any of the previous or following features, where the multiple different ML algorithms include a decision tree algorithm, a forest algorithm, a gradient boosting algorithm, and a multiple linear regression algorithm.

In a second implementation, a non-transitory, computer-readable medium stores one or more instructions executable by a computer system to perform operations including the following. Real-time energy stream data for a gas processing plant is received. Correlations of energy streams between demand-side energy demands for meeting production requirements of the gas processing plant and fuel requirements for supply-side equipment of the gas processing plant are generated using historical energy and production stream data. Machine learning algorithms are trained using the correlations of the energy streams to identify relationships among dependent variables and independent variables of demand-side energy consumers and supply-side energy sources with an objective to achieve best fit forecasted value of a dependent variable with minimum error compared to actual values associated with supply and demand. Forecasted values of total energy consumption of the gas processing plant are determined using the machine learning algorithms and the real-time energy stream data. Forecasting models of the machine learning algorithms are re-trained using new data if an error between the forecasted values and actual energy demand exceeds a threshold. An energy intensity (EI) for the gas processing plant is generated using the forecasted values of the total energy consumption of the gas processing plant. The EI is an assessment of energy efficiency of the gas processing plant. $CO_2$ emissions for the gas processing plant are determined using the predicted energy consumption by the gas processing plant and by applying emission factors for fuel gas consumed by the gas processing plant.

The foregoing and other described implementations can each, optionally, include one or more of the following features:

A first feature, combinable with any of the following features, where the real-time energy stream data includes: feed streams for wet gas from gas fields and gas oil separation plants (GOSPs); product streams for sales gas (SG), hydrocarbon condensate (HC Cond), sulfur (Sul) from sulfur recovery units (SRUs); energy streams from energy sources including power (P), steam (S), fuel gas for boilers (FGB), fuel gas for cogeneration plant (FGC), and fuel gas for other processes (FGP); and ambient temperatures (T).

A second feature, combinable with any of the previous or following features, where supply-side equipment includes cogeneration plant and boilers.

A third feature, combinable with any of the previous or following features, the method further including generating, using the $CO_2$ emissions for the gas processing plant, a dashboard that includes energy efficiency key process indicator (KPI) information.

A fourth feature, combinable with any of the previous or following features, where the dashboard includes an actual EI KPI reading, a predicted EI KPI reading, a computed different between the actual EI KPI reading, and the predicted EI KPI reading, a total production, and a total energy.

A fifth feature, combinable with any of the previous or following features, the method further including performing data cleaning on the real-time energy stream data.

A sixth feature, combinable with any of the previous or following features, the method further including: executing, using the real-time energy stream data, multiple different ML algorithms; scoring the multiple different ML algorithms based on accuracy of results; and selecting, from the multiple different ML algorithms and based on the scoring; a specific algorithm that best produces an acceptable accuracy result.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at the application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A gas processing plant, comprising a computer system configured to operate the gas processing plant, the computer system configured to perform operations comprising:

receiving real-time energy stream data for the gas processing plant;

generating, using historical energy and production stream data, correlations of energy streams between demand-side energy demands for meeting production requirements of the gas processing plant and fuel requirements for supply-side equipment of the gas processing plant;

training, using the correlations of the energy streams, machine learning algorithms to identify relationships among dependent variables and independent variables of demand-side energy consumers and supply-side energy sources with an objective to achieve a best fit forecasted value of a dependent variable with minimum error compared to actual values associated with supply and demand;

determining, using the machine learning algorithms and the real-time energy stream data, forecasted values of total energy consumption of the gas processing plant;

re-training forecasting models of the machine learning algorithms using new data if an error between the forecasted values and actual energy demand exceeds a threshold;

generating, using the forecasted values of the total energy consumption of the gas processing plant, an energy intensity (EI) for the gas processing plant, wherein the EI is defined as a ratio of net energy consumption to total production and indicates an assessment of energy efficiency of the gas processing plant;

determining, based on the forecasted values of total energy consumption, a predicted energy consumption by the gas processing plant; and determining, using the predicted energy consumption by the gas processing plant and by applying emission factors for fuel gas consumed by the gas processing plant, forecasted $CO_2$ emissions for the gas processing plant.

2. The gas processing plant of claim 1, wherein the real-time energy stream data comprises: feed streams for wet gas from gas fields and gas oil separation plants (GOSPs); product streams for sales gas (SG), hydrocarbon condensate (HC Cond), sulfur (Sul) from sulfur recovery units (SRUs); energy streams from energy sources comprising power (P), steam(S), fuel gas for boilers (FGB), fuel gas for cogeneration plant (FGC), and fuel gas for other processes (FGP); and ambient temperatures (T).

3. The gas processing plant of claim 2, wherein the computer system is further configured to perform operations further comprising, based on the forecasted $CO_2$ emissions for the gas processing plant, changing one or more of the feed streams for wet gas from gas fields and gas oil separation plants (GOSPs); product streams for sales gas (SG), hydrocarbon condensate (HC Cond), sulfur (Sul) from sulfur recovery units (SRUs); and energy streams from energy sources comprising power (P), steam(S), fuel gas for boilers (FGB), fuel gas for cogeneration plant (FGC), and fuel gas for other processes (FGP) to change the $CO_2$ emissions.

4. The gas processing plant of claim 1, wherein the supply-side equipment comprises cogeneration plant and boilers.

5. The gas processing plant of claim 1, wherein the computer system is further configured to perform operations comprising:

generating, using the forecasted $CO_2$ emissions and $CO_2$ emissions for the gas processing plant, a dashboard that comprises energy efficiency key process indicator (KPI) information.

6. The gas processing plant of claim 5, wherein the dashboard comprises an actual EI KPI reading, a predicted EI KPI reading, a computed different between the actual EI KPI reading, and the predicted EI KPI reading, a total production, and a total energy.

7. The gas processing plant of claim 1, wherein the computer system is further configured to perform operations comprising:

performing data cleaning on the real-time energy stream data.

8. The gas processing plant of claim 1, further comprising:

executing, using the real-time energy stream data, multiple different ML algorithms;

scoring the multiple different ML algorithms based on accuracy of results; and selecting, from the multiple different ML algorithms and based on the scoring, a specific algorithm that best produces an acceptable accuracy result.

9. The gas processing plant of claim 8, wherein the multiple different ML algorithms include a decision tree algorithm, a forest algorithm, a gradient boosting algorithm, and a multiple linear regression algorithm.

10. A computer system for a gas processing plant, the computer system comprising a non-transitory, computer-readable medium storing one or more instructions executable by the computer system to perform operations of the gas processing plant comprising:

receiving real-time energy stream data for the gas processing plant;

generating, using historical energy and production stream data, correlations of energy streams between demand-side energy demands for meeting production requirements of the gas processing plant and fuel requirements for supply-side equipment of the gas processing plant;

training, using the correlations of the energy streams, machine learning algorithms to identify relationships among dependent variables and independent variables of demand-side energy consumers and supply-side energy sources with an objective to achieve a best fit forecasted value of a dependent variable with minimum error compared to actual values associated with supply and demand;

determining, using the machine learning algorithms and the real-time energy stream data, forecasted values of total energy consumption of the gas processing plant;

re-training forecasting models of the machine learning algorithms using new data if an error between the forecasted values and actual energy demand exceeds a threshold;

generating, using the forecasted values of the total energy consumption of the gas processing plant, an energy intensity (EI) for the gas processing plant, wherein the EI is defined as a ratio of net energy consumption to total production and indicates an assessment of energy efficiency of the gas processing plant;

determining, based on the forecasted values of total energy consumption, a predicted energy consumption by the gas processing plant; and determining, using the predicted energy consumption by the gas processing plant and by applying emission factors for fuel gas consumed by the gas processing plant, forecasted $CO_2$ emissions for the gas processing plant.

11. The computer system of claim 10, wherein the real-time energy stream data comprises: feed streams for wet gas from gas fields and gas oil separation plants (GOSPs); product streams for sales gas (SG), hydrocarbon condensate (HC Cond), sulfur (Sul) from sulfur recovery units (SRUs); energy streams from energy sources comprising power (P), steam(S), fuel gas for boilers (FGB), fuel gas for cogeneration plant (FGC), and fuel gas for other processes (FGP); and ambient temperatures (T).

12. The computer system of claim 10, wherein supply-side equipment comprises cogeneration plant and boilers.

13. The computer system of claim 10, the operations further comprising:

generating, using the $CO_2$ emissions for the gas processing plant, a dashboard that comprises energy efficiency key process indicator (KPI) information.

14. The computer system of claim 13, wherein the dashboard comprises an actual EI KPI reading, a predicted EI KPI reading, a computed different between the actual EI KPI reading, and the predicted EI KPI reading, a total production, and a total energy.

15. The computer system of claim 10, the operations further comprising:

performing data cleaning on the real-time energy stream data.

16. The computer system of claim 10, the operations further comprising:

executing, using the real-time energy stream data, multiple different ML algorithms;

scoring the multiple different ML algorithms based on accuracy of results; and selecting, from the multiple different ML algorithms and based on the scoring, a specific algorithm that best produces an acceptable accuracy result.

* * * * *